US010500690B2

(12) United States Patent
Pizzola (10) Patent No.: US 10,500,690 B2
(45) Date of Patent: Dec. 10, 2019

(54) METHOD AND APPARATUS FOR ALIGNING A PROCESS GAS JET NOZZLE AND LASER MACHINING BEAM

(71) Applicant: United Technologies Corporation, Farmington, CT (US)

(72) Inventor: Anthony Pizzola, Coventry, CT (US)

(73) Assignee: United Technologies Corporation, Farmington, CT (US)

( * ) Notice: Subject to any disclaimer, the term of this patent is extended or adjusted under 35 U.S.C. 154(b) by 225 days.

(21) Appl. No.: 15/793,138

(22) Filed: Oct. 25, 2017

(65) Prior Publication Data

US 2019/0118326 A1   Apr. 25, 2019

(51) Int. Cl.
| | | |
|---|---|---|
| *G01B 5/25* | (2006.01) |
| *B23Q 17/22* | (2006.01) |
| *B23Q 3/18* | (2006.01) |
| *B23K 37/00* | (2006.01) |
| *B23K 26/14* | (2014.01) |
| *B23K 26/70* | (2014.01) |
| *B23K 15/00* | (2006.01) |
| *B23K 26/035* | (2014.01) |

(52) U.S. Cl.
CPC ...... *B23Q 17/2275* (2013.01); *B23K 26/1462* (2015.10); *B23K 26/702* (2015.10); *B23K 37/00* (2013.01); *B23Q 3/186* (2013.01); *B23K 15/0013* (2013.01); *B23K 26/035* (2015.10)

(58) Field of Classification Search
CPC ................................................. B23Q 17/2275
USPC ........................................ 33/628, 613, 645
See application file for complete search history.

(56) References Cited

U.S. PATENT DOCUMENTS

| | | | | |
|---|---|---|---|---|
| 2,145,116 A | * | 1/1939 | Howard | B23Q 17/24 356/392 |
| 7,245,199 B1 | * | 7/2007 | Reilly | B23D 59/002 33/628 |
| 7,392,645 B1 | * | 7/2008 | Elmore | A01D 34/54 33/628 |
| 9,296,067 B2 | | 3/2016 | Cathry et al. | |
| 9,373,163 B2 | | 6/2016 | Wersborg et al. | |
| 9,937,590 B2 | | 4/2018 | Cathry et al. | |

(Continued)

FOREIGN PATENT DOCUMENTS

| | | |
|---|---|---|
| CN | 204064158 U | 12/2014 |
| EP | 2595776 A1 | 5/2013 |
| JP | 2014-108452 A | 6/2014 |

OTHER PUBLICATIONS

European Search Report dated Apr. 4, 2019 issued for corresponding European Patent Application No. 18202704.5.

*Primary Examiner* — George B Bennett
(74) *Attorney, Agent, or Firm* — Bachman & LaPointe, P.C.

(57) ABSTRACT

An alignment tool for a laser machine tool includes a frame that is mountable to the laser cutting head of the laser machine tool; a first indicator mounted to the frame along an X-axis; a second indicator mounted to the frame along a Y-axis; a position device mounted to the frame, the position device operable to reference upon a surface of the laser cutting head to align the first indicator along an X-axis of the laser cutting head, and to align the second indicator along a Y-axis of the laser cutting head; and a fastener mounted to the frame, the fastener operable to retain the frame to the laser cutting head.

20 Claims, 6 Drawing Sheets

(56) References Cited

U.S. PATENT DOCUMENTS

| | | | |
|---|---|---|---|
| 2010/0024233 A1* | 2/2010 | Boland | B23Q 15/22 33/628 |
| 2015/0165580 A1* | 6/2015 | Holland | B23Q 17/2275 408/1 BD |
| 2019/0015928 A1* | 1/2019 | Hagenlocher | B23K 26/032 |
| 2019/0084084 A1* | 3/2019 | Pizzola | B23K 26/1462 |

* cited by examiner

METHOD AND APPARATUS FOR ALIGNING A PROCESS GAS JET NOZZLE AND LASER MACHINING BEAM

BACKGROUND

The present disclosure relates to adjusting the relative positions of the axes of a laser machining beam and a process gas jet of a laser machining system.

In various types of laser machines, a process gas jet is directed at the laser machining point. In laser cutting, oxygen or inert gases such as nitrogen or argon, are used as process gases. Molten material that is formed in the course of the cutting process is intended to be blown away from the kerf by the process gases. In these processes, a desired relative position of the laser machining beam relative to the process gas jet is required. In laser cutting, optimum machining results are achieved when an axis of the laser beam and an axis of the gas jet coincide. When changing nozzles, during an impact of the nozzle, or just over time, the desired relative positioning of the laser beam axis and the gas jet axis may become misaligned.

SUMMARY

An alignment tool for a laser machine tool according to one disclosed non-limiting embodiment of the present disclosure includes a frame that is mountable to a laser cutting head of the laser machine tool; a first indicator mounted to the frame along an X-axis; a second indicator mounted to the frame along a Y-axis; a position device mounted to the frame, the position device operable to reference upon a surface of the laser cutting head to align the first indicator along an X-axis of the laser cutting head, and to align the second indicator along a Y-axis of the laser cutting head; and a fastener mounted to the frame, the fastener operable to retain the frame to the laser cutting head.

A further aspect of the present disclosure includes that the first indicator and the second indicator are digital gauges each with a probe that contacts a process gas nozzle of the laser cutting head.

A further aspect of the present disclosure includes that the position device references upon a flat surface of the laser cutting head.

A further aspect of the present disclosure includes that the position device comprises a pad with a flat surface.

A further aspect of the present disclosure includes that the position device is spring biased to retract the pad of the position device from the flat surface of the laser cutting head.

A further aspect of the present disclosure includes that the position device comprises a rod of a predetermined length between a pad and a button, the position device operable to align the first indicator along an X-axis of the laser cutting head, and to align the second indicator along a Y-axis of the laser cutting head.

A further aspect of the present disclosure includes that the fastener is threaded to the frame.

A further aspect of the present disclosure includes that the fastener contacts a collar of the laser cutting head, the collar receives a process gas jet nozzle such that the gas jet nozzle is positioned within the collar by a multiple of adjustment screws.

A further aspect of the present disclosure includes displaying coordinates of the movement between the laser cutting head and the process gas jet nozzle on at least one of the indicators in response to movement of at least one of the multiple of adjustment screws located in the collar.

A further aspect of the present disclosure includes that the first indicator contacts the process gas jet nozzle along the X-axis and the second indicator contacts the process gas jet nozzle along the Y-axis.

A further aspect of the present disclosure includes that two diametrically opposed adjustment screws are aligned along the respective X-axis and Y-axis.

A laser machine tool according to one disclosed non-limiting embodiment of the present disclosure includes a laser cutting head that defines a laser beam axis; a process gas jet nozzle adjustable with respect to the laser cutting head, the process gas jet nozzle defines a gas jet axis; and an alignment tool mountable to the laser cutting head of the laser machine tool, the alignment tool references upon a surface of the laser cutting head to align a first indicator along an X-axis of the laser cutting head, and align a second indicator along a Y-axis of the laser cutting head, the alignment tool operable to track movement of the process gas jet nozzle with respect to the laser cutting head during adjustment.

A further aspect of the present disclosure includes a position device of the alignment tool, the position device references upon the surface of the laser cutting head, the surface being a flat surface.

A further aspect of the present disclosure includes that a fastener of the alignment tool is threaded into contact with the collar of the laser cutting head.

A method for adjusting a process gas jet nozzle with respect to a laser cutting head to align a gas jet axis with respect to a laser beam axis of a laser machine tool, the method according to one disclosed non-limiting embodiment of the present disclosure includes mounting an alignment tool with respect to a surface of the laser cutting head to align a first indicator along an X-axis of the laser cutting head, and align a second indicator along a Y-axis of the laser cutting head; zeroing the first indicator and the second indicator; and adjusting a process gas jet nozzle in the X-Y plane until the first indicator and the second indicator indicate a correction such that the gas jet axis is coaxially aligned with the laser beam axis.

A further aspect of the present disclosure includes that mounting the alignment tool with respect to the surface of the laser cutting head comprises orienting the alignment tool relative to the laser cutting head and contacting a flat reference surface of the laser cutting head with a position device of the alignment tool.

A further aspect of the present disclosure includes that mounting the alignment tool with respect to the surface of the laser cutting head comprises depressing a position device of the alignment tool to contact the surface of the laser cutting head while a fastener of the alignment tool is tightened to retain the frame to the laser cutting head, the surface being a flat surface on the laser cutting head.

A further aspect of the present disclosure includes that adjusting the process gas jet nozzle in the X-Y plane comprises adjusting a multiple of adjustment screws on a collar between the laser cutting head and the process gas jet nozzle to adjust the process gas jet nozzle in an X-Y plane to thereby adjust a gas jet axis with respect to a laser beam axis.

A further aspect of the present disclosure includes running an alignment subroutine on a controller of the laser machine tool to determine the correction in an X-Y plane between the laser beam axis with respect to the gas jet axis, the alignment subroutine comprises: determining a location of the laser beam axis based on a position of the laser cutting head; cutting a hole in a sacrificial workpiece with the laser of the laser cutting head; measuring the hole with a process gas jet nozzle mounted to the laser cutting head to determine a location of a gas jet axis at a center of the hole; comparing the location of the gas jet axis with respect to the location of the laser beam axis.

A further aspect of the present disclosure includes running an alignment subroutine on a controller of the laser machine tool to determine the correction in an X-Y plane between the laser beam axis with respect to the gas jet axis, the position device ensuring that the alignment tool is mounted to align the indicators to correspond with the X and Y axes in the X-Y plane of the laser machine head such that the indicators then show movement in the X and Y axes during adjustment of the process gas jet nozzle until the correction is reached, at which point the gas jet axis and the laser beam axis are coaxial.

The foregoing features and elements may be combined in various combinations without exclusivity, unless expressly indicated otherwise. These features and elements as well as the operation of the invention will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
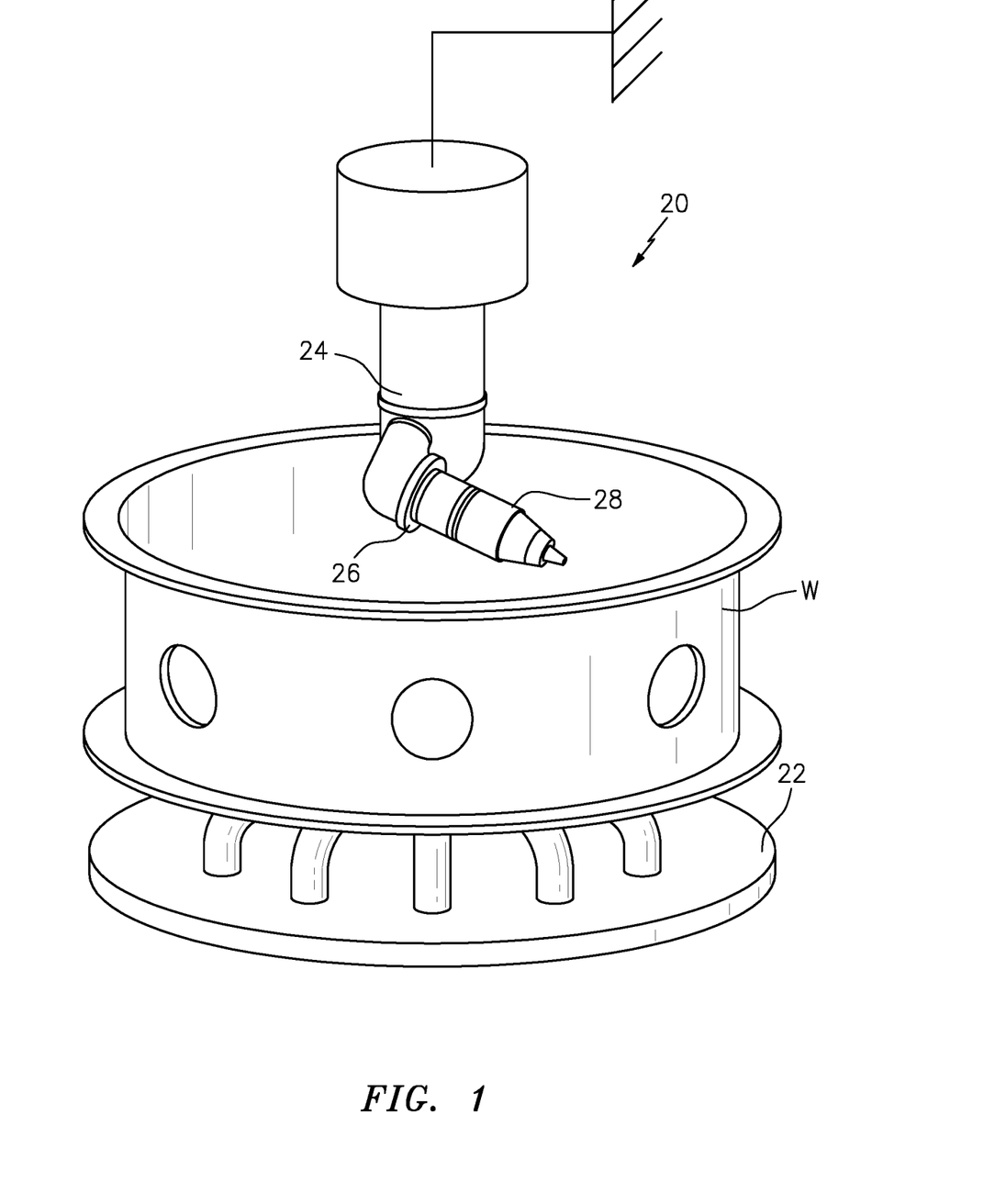
FIG. 1 is a schematic view of a laser cutting machine during workpiece cutting.

FIG. 1 schematically illustrates a laser machine tool 20 in the form of a laser cutting machine. The laser machine tool 20 generally includes a machine bed 22, over which a first joint 24 is movably guided in a first direction. The first joint 24 supports a second joint 26 with a laser cutting head 28. Cooperatively with the second joint 26, the laser cutting head 28 is movable in a second direction relative the first joint 24. Furthermore, the laser cutting head 28 is movable relative to the second joint 26 in a third direction. Beneath the laser cutting head 28, a workpiece W is arranged on the machine bed 22.

Figure 2:
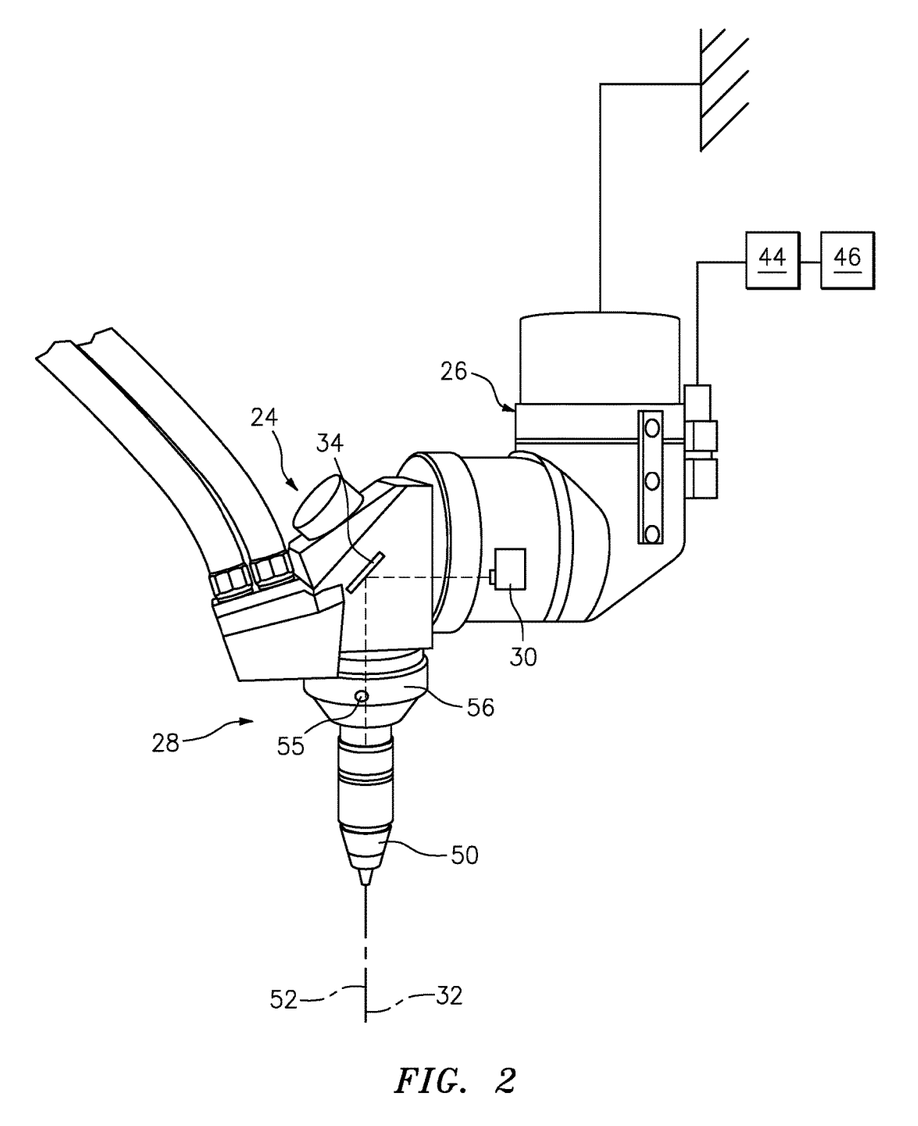
FIG. 2 is a schematic view of a laser cutting head of the laser cutting machine according to FIG. 1.

With reference to FIG. 2, the laser cutting head 28 includes a laser 30 that generates a laser beam along a laser beam axis 32. The laser 30 is contained within the laser cutting head 28 and may be directed through optics 34 to direct the laser beam through a process gas jet nozzle 50. The mobility of the first joint 24 and the second joint 26 permits a desired point on the workpiece W to be machined with the laser cutting beam. The mobility of the laser cutting head 28 in the Z-direction is used to adjust the focal position of the laser cutting beam in the direction transverse to the workpiece W.

A motor drive 44 of the laser machine tool 20, which is controlled by a controller 46, is used to move the laser cutting head 28. The motor drive 44 may be operable to move the laser cutting head 28 in a coordinate system. For example, a 6-axis laser machine tool 20 has the ability to interpolate either linearly for X, Y, Z, or rotationally A, B, and U. In addition, an R axis may be defined for each orientation of the coordinate systems when viewed isometrically. The R axis is an artificial axis created by the machine software that can move the laser cutting head 28 parallel along a vector created normal to the workpiece W, however nomenclature often varies by machine. The operation of the laser machine tool 20 may also be integrated into the controller 46 to position the laser 30 and the associated process gas jet nozzle 50. The controller 46 is operable to continually determine the position of the laser cutting head 28 within the coordinate system.

The process gas jet nozzle 50 is mounted to the laser cutting head 28. A process gas jet, for example nitrogen, is directed from the process gas jet nozzle 50 to blow the molten metal formed at the machining point of the laser beam from the resulting kerf. Ideally, the laser beam axis 32 from the laser 30, and a gas jet axis 52 of the process gas jet nozzle 50 coincide in a coaxial manner. That is, the laser beam is directed along the gas jet axis 52 of the process gas jet nozzle 50.

In routine operation of the laser machine tool 20, however, the laser cutting beam axis 32 and the process gas jet axis 52 may move out of alignment. To adjust any variation of the actual relative positions of the laser beam axis 32 and the gas jet axis 52 from the desired coaxial positioning, a multiple of adjustment screws 55 (e.g., set screws) are located between the laser cutting head 28 and the process gas jet nozzle 50 to adjust the process gas jet nozzle 50 in an X-Y plane to thereby adjust the process gas jet nozzle 50 and thus the gas jet axis 52 with respect to the laser beam axis 32. The adjustment screws may be positioned around a collar 56 of the laser cutting head 28 and may be offset from one another by ninety degrees around the circumference. Diametrically opposed adjustment screws 55 may be aligned with respect to one of the X or Y reference directions. For example, two adjustment screws 55 may be aligned in the X reference direction, and two adjustment screws may be aligned in the Y reference direction.

The controller 46 is operable to determine the position of the laser cutting head 28 within the coordinate system. The process gas jet nozzle 50 is also utilized as a sensor for the controller 46 as the process gas jet nozzle 50 measures capacitance at a tip thereof to, for example, identify an edge of a hole in the workpiece W as the capacitance changes at the edge. Other methods for determining misalignment exist such as via a bore camera through the process gas jet nozzle 50.

Figure 3:
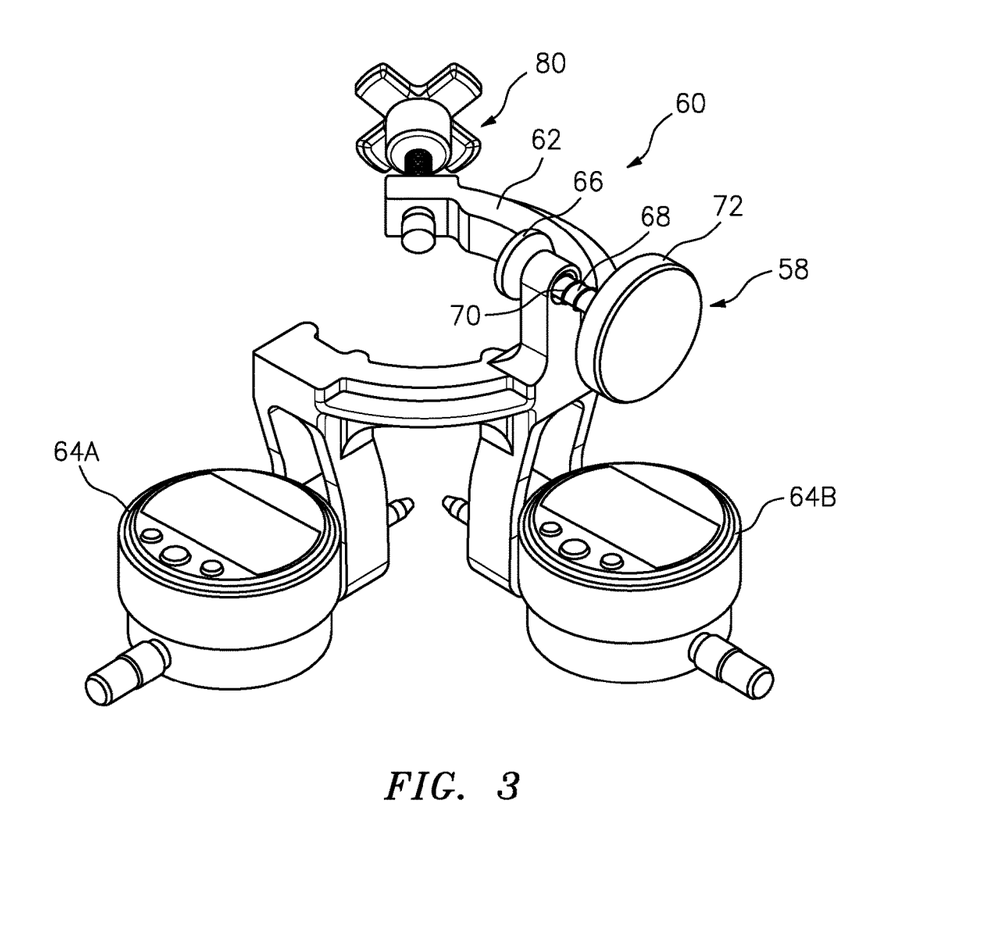
FIG. 3 is a schematic view of the alignment tool.
Figure 4:
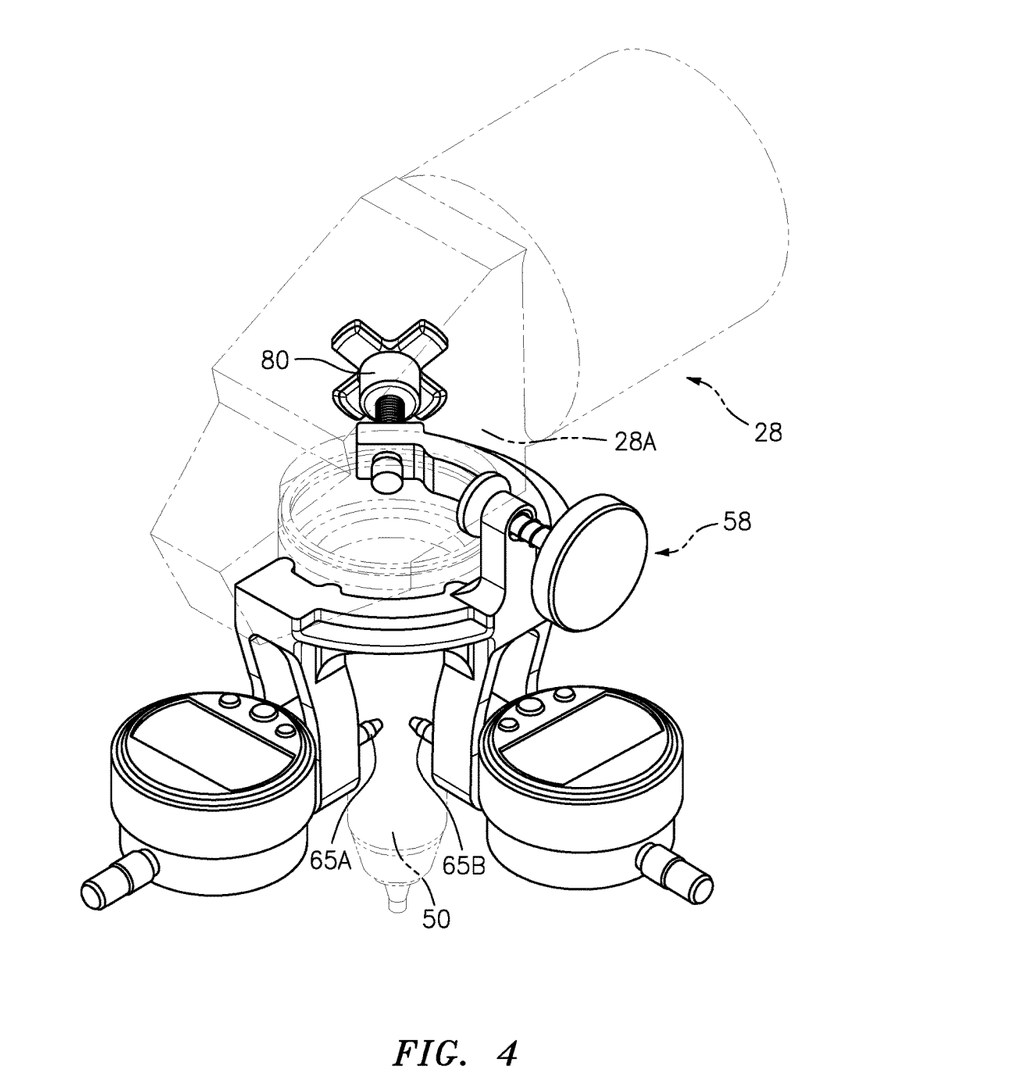
FIG. 4 is a schematic view of the laser cutting head with an alignment tool.

With reference to FIG. 3, the alignment tool 60 generally includes a frame 62 that is mountable to the laser cutting head 28 (FIG. 4) to support a first and a second indicator 64A, 64B (e.g., part number 543-392B available from Mitutoyo America Corporation (Aurora, Ill.)) to interface with the process gas jet nozzle 50. The first and second indicator 64A, 64B may be a dial indicator that may also be referred to as a dial gauge, probe, or electronic indicator that measure a position of the process gas jet nozzle 50 with respect to the laser cutting head 28. For example, the indicator has a linear measurement range of 0 to 0.5 inches (0 to 12.7 mm), a resolution of 0.00005 inches (0.001 mm), and an accuracy of + or −0.0001 inches.

The frame 62 is positioned with respect to the laser cutting head 28 by a position device 58 that references off of a flat surface 28A (FIG. 4) of the laser cutting head 28 to rotationally align an X-axis and a Y-axis of the alignment tool 60 with the X-axis and Y-axis of the laser cutting head 28.

The position device 58 and a fastener 80 are mounted to the frame 62. The position device 58 may be a selectively operable device that properly rotationally positions the alignment tool 60. The fastener 80 then retains the alignment tool 60 to the laser cutting head 28. In other embodiments, the position device 58 may be a block or other positioning device that is attached or removable from the frame 62. In other embodiments, the fastener 80 may be a clamp or other retainer.

In one embodiment, the position device 58 includes a pad 66, a rod 68, a spring 70, and a button 72. The rod 68 is of a predetermined length and of a close length tolerance such that when the button 72 is pressed to compress the spring 70 until the pad 66 interfaces with the flat surface 28A of the laser cutting head 28, the X-axis and the Y-axis of the alignment tool 60 is rotationally aligned with the X-axis and Y-axis of the laser cutting head 28.

Figure 5:
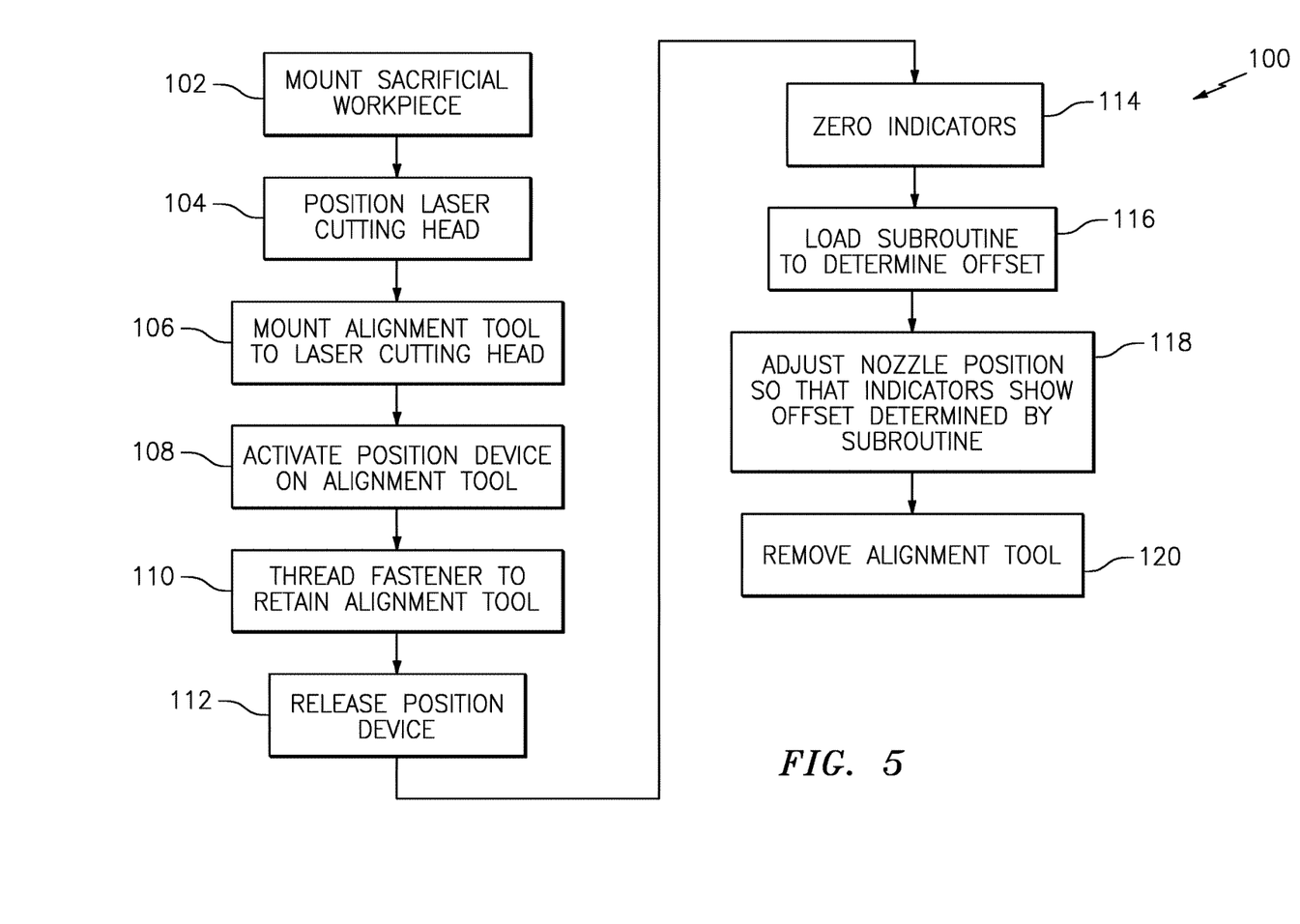
FIG. 5 is a block diagram flowchart of a method to align a laser and a process gas jet nozzle of the laser cutting head.

With reference to FIG. 5, a method 100 for positioning the laser beam and an associated process gas jet of the laser machine tool 20 includes mounting (102) a sacrificial workpiece W in the laser machine tool 20. Next, the operator positions (104) the laser cutting head 28 over the sacrificial workpiece W.

The alignment tool 60 is then mounted to the laser cutting head 28 (106).

The position device 58 is then activated (108) so that the alignment tool 60 is rotationally aligned in the X-axis and the Y-axis of the alignment tool 60 with the X-axis and Y-axis of the laser cutting head 28. In the disclosed embodiment, the position device 58 need only be pressed until the pad 66 interfaces with the flat surface 28A of the laser cutting head 28. This rotationally aligns the alignment tool 60.

Once aligned, the fastener 80 is threaded into the alignment tool 60 to retain (110) the alignment tool 60 to the laser cutting head 28. The fastener 80 is screwed in while the position device 58 is pressed in to maintain the rotational position of the position device 58. Once the fastener 80 is screwed in, the position device 58 may be released (112) as the alignment tool 60 is now properly attached.

The first and a second indicator 64A, 64B are then zeroed out (114). That is, the first and a second indicator 64A, 64B are set to zero as the probes 65A, 65B (FIG. 4) thereof are in contact with the process gas jet nozzle 50.

The operator then loads (116) a subroutine for measurement of the alignment between the laser beam axis 32 with respect to the gas jet axis 52 into the controller 46. The subroutine may be an algorithm or other machine program that operates on the controller 46. Once the operator initially positions the laser cutting head 28 over the sacrificial workpiece W, the algorithm identifies this initial position 200 (FIG. 6) as the initial gas jet axis 52 location and records this as the initial axis position.

From the initial position, the algorithm activates the laser 30 of the laser cutting head 28 to cut a hole "H" (FIG. 6) in the sacrificial workpiece W. The hole "H" that is cut may be of an arbitrary size, such as 0.5 inches (12.7 mm) in diameter. The laser beam at the focal point on the workpiece W is, for example, 0.005 inches (0.127 mm) in diameter. The exit of the process gas jet nozzle 50 is typically 0.060-0.080 inches (1.5-2.0 mm) in diameter.

Figure 6:
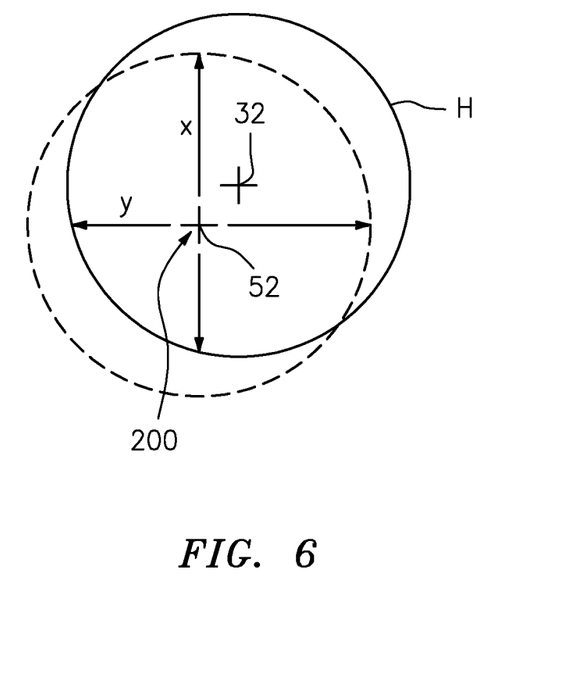
FIG. 6 is a schematic view of a sacrificial hole and alignment relationship between the laser that cut the hole and the process gas jet nozzle that is utilized to measure the hole.

The process gas jet nozzle 50 initial position (the initial gas jet axis 52 location) is the initial laser beam axis 32 location if coaxially aligned. The laser 30, and thus the laser beam axis 32, however, may be misaligned with the gas jet axis 52 and thus the laser 30 is not coaxial with the process gas jet nozzle 50. This offset is determined.

Once the hole "H" is cut, the controller 46 then utilizes the process gas jet nozzle 50 to scan the hole "H" to determine an edge of the hole. The hole "H" may be scanned along the X-axis and the Y-axis such that an edge is sensed by a change in capacitance sensed at the process gas jet nozzle 50. Since the hole is circular, only a few points on the edge need be determined to identify the hole location, diameter, and thus the center thereof. The controller 46 then uses the edge location to calculate where a center of the hole "H" is located in the sacrificial workpiece W. That is, the difference between the laser beam axis 32 with respect to the gas jet axis 52 is determined because the laser 30 cuts the hole "H" without knowing the center. The center is the initial gas jet axis 52 obtained from the original position of the laser cutting head 28 The process gas jet nozzle 50 measures the hole "H" such that any discrepancy therebetween is identified. That is, the laser cutting head 28 original position is known, but the process gas jet nozzle 50 may not be coaxial with the laser 30.

The offset between the laser beam axis 32 and the gas jet axis 52 is then determined by the controller 46. The determined offset of the laser beam axis 32 from the gas jet axis 52 forms the basis for a correction of the relative position of the two axes 32, 52.

Next, the operator adjusts (118) the adjustment screws 55 (FIG. 2) to adjust the process gas jet nozzle 50 in an X-Y plane until the first and second indicator 64A, 64B display the offset determined by the controller 46 to thereby adjust the process gas jet nozzle 50 and thus the gas jet axis 52 with respect to the laser beam axis 32.

The first and second indicator 64A, 64B provide accurate, precise and repeatable alignment of the laser beam axis 32 and the gas jet axis 52 with minimal operator intervention and facilitate increased alignment opportunities during manufacturing.

The alignment tool 60 is then removed (120) so that machining operations may begin.

The method 100 essentially removes potential error with respect to physically aligning the laser machine tool process gas jet nozzle and the laser. This replaces the guess and check method with direct quantitative feedback to the operator by the first and second indicator 64A, 64B. This also increases the accuracy and precision of the alignment depending on the accuracy and precision of the indicators. This decrease in time and skill required to complete the nozzle alignment could be used to justify increasing the frequency of alignments which could lead to fewer quality non-conformances.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that relative positional terms such as "forward," "aft," "upper," "lower," "above," "below," and the like are with reference to the normal operational attitude of the vehicle and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although particular sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An alignment tool for a laser machine tool, comprising:
a frame that is mountable to a laser cutting head of the laser machine tool;
a first indicator mounted to the frame along an X-axis;
a second indicator mounted to the frame along a Y-axis;
a position device mounted to the frame, the position device operable to reference upon a surface of the laser cutting head to align the first indicator along an X-axis of the laser cutting head, and to align the second indicator along a Y-axis of the laser cutting head; and
a fastener mounted to the frame, the fastener operable to retain the frame to the laser cutting head.

2. The alignment tool as recited in claim 1, wherein the first indicator and the second indicator are digital gauges each with a probe that contacts a process gas nozzle of the laser cutting head.

3. The alignment tool as recited in claim 1, wherein the position device references upon a flat surface of the laser cutting head.

4. The alignment tool as recited in claim 3, wherein the position device comprises a pad with a flat surface.

5. The alignment tool as recited in claim 4, wherein the position device is spring biased to retract the pad of the position device from the flat surface of the laser cutting head.

6. The alignment tool as recited in claim 1, wherein the position device comprises a rod of a predetermined length between a pad and a button, the position device operable to align the first indicator along an X-axis of the laser cutting head, and to align the second indicator along a Y-axis of the laser cutting head.

7. The alignment tool as recited in claim 1, wherein the fastener is threaded to the frame.

8. The alignment tool as recited in claim 7, wherein the fastener contacts a collar of the laser cutting head, the collar receives a process gas jet nozzle such that the gas jet nozzle is positioned within the collar by a multiple of adjustment screws.

9. The alignment tool as recited in claim 8, further comprising displaying coordinates of the movement between the laser cutting head and the process gas jet nozzle on at least one of the indicators in response to movement of at least one of the multiple of adjustment screws located in the collar.

10. The alignment tool as recited in claim 9, wherein the first indicator contacts the process gas jet nozzle along the X-axis and the second indicator contacts the process gas jet nozzle along the Y-axis.

11. The alignment tool as recited in claim 10, wherein two diametrically opposed adjustment screws are aligned along the respective X-axis and Y-axis.

12. A laser machine tool, comprising:
a laser cutting head that defines a laser beam axis;
a process gas jet nozzle adjustable with respect to the laser cutting head, the process gas jet nozzle defines a gas jet axis; and
an alignment tool mountable to the laser cutting head of the laser machine tool, the alignment tool references upon a surface of the laser cutting head to align a first indicator along an X-axis of the laser cutting head, and align a second indicator along a Y-axis of the laser cutting head, the alignment tool operable to track movement of the process gas jet nozzle with respect to the laser cutting head during adjustment.

13. The laser machine tool as recited in claim 12, further comprising a position device of the alignment tool, the position device references upon the surface of the laser cutting head, the surface being a flat surface.

14. The laser machine tool as recited in claim 12, wherein a fastener of the alignment tool is threaded into contact with the collar of the laser cutting head.

15. A method for adjusting a process gas jet nozzle with respect to a laser cutting head to align a gas jet axis with respect to a laser beam axis of a laser machine tool, the method comprising:
mounting an alignment tool with respect to a surface of the laser cutting head to align a first indicator along an X-axis of the laser cutting head, and align a second indicator along a Y-axis of the laser cutting head;
zeroing the first indicator and the second indicator; and
adjusting a process gas jet nozzle in the X-Y plane until the first indicator and the second indicator indicate a correction such that the gas jet axis is coaxially aligned with the laser beam axis.

16. The method as recited in claim 15, wherein mounting the alignment tool with respect to the surface of the laser cutting head comprises orienting the alignment tool relative to the laser cutting head and contacting a flat reference surface of the laser cutting head with a position device of the alignment tool.

17. The method as recited in claim 15, wherein mounting the alignment tool with respect to the surface of the laser cutting head comprises depressing a position device of the alignment tool to contact the surface of the laser cutting head while a fastener of the alignment tool is tightened to retain the frame to the laser cutting head, the surface being a flat surface on the laser cutting head.

18. The method as recited in claim 15, wherein adjusting the process gas jet nozzle in the X-Y plane comprises adjusting a multiple of adjustment screws on a collar between the laser cutting head and the process gas jet nozzle to adjust the process gas jet nozzle in an X-Y plane to thereby adjust a gas jet axis with respect to a laser beam axis.

19. The method as recited in claim 15, further comprising running an alignment subroutine on a controller of the laser machine tool to determine the correction in an X-Y plane between the laser beam axis with respect to the gas jet axis, the alignment subroutine comprises:

determining a location of the laser beam axis based on a position of the laser cutting head;

cutting a hole in a sacrificial workpiece with the laser of the laser cutting head;

measuring the hole with a process gas jet nozzle mounted to the laser cutting head to determine a location of a gas jet axis at a center of the hole;

comparing the location of the gas jet axis with respect to the location of the laser beam axis.

20. The method as recited in claim 15, further comprising running an alignment subroutine on a controller of the laser machine tool to determine the correction in an X-Y plane between the laser beam axis with respect to the gas jet axis, the position device ensuring that the alignment tool is mounted to align the indicators to correspond with the X and Y axes in the X-Y plane of the laser machine head such that the indicators then show movement in the X and Y axes during adjustment of the process gas jet nozzle until the correction is reached, at which point the gas jet axis and the laser beam axis are coaxial.

\* \* \* \* \*